Aug. 7, 1928.
M. PLOCHMANN
POWER PLANT
Filed March 13, 1926
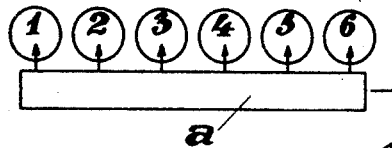
Fig. 1.
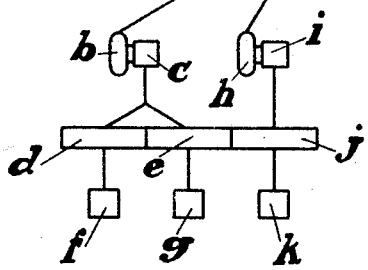
Fig. 2.
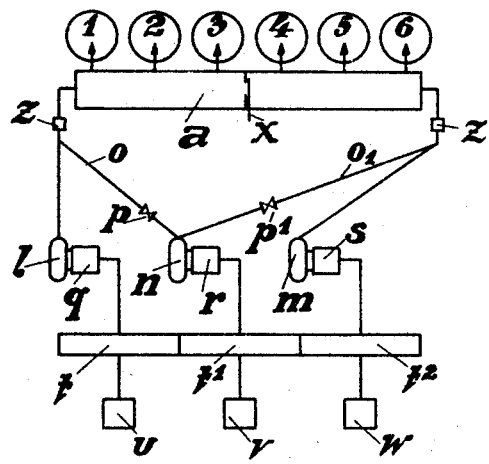
Fig. 3.
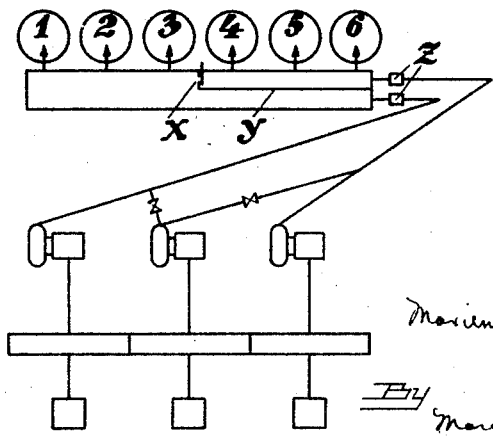

Patented Aug. 7, 1928.

1,679,494

UNITED STATES PATENT OFFICE.

MAXIMILIAN PLOCHMANN, OF AUGSBURG, GERMANY, ASSIGNOR TO MASCHINEN-FABRIK AUGSBURG-NÜRNBERG A.-G., OF AUGSBURG, GERMANY, A CORPORATION.

POWER PLANT.

Application filed March 13, 1926, Serial No. 94,525, and in Germany March 23, 1925.

The two stroke engines at present used for the propulsion of single screw ships are provided with turbo blowers acting as scavenging air pumps, and as a rule two turbo blowers are used each of which is so dimensioned that its delivery is sufficient for the whole scavenging air requirements of the two stroke engine. Normally one of the turbo blowers is working and the other constitutes a "stand by" to be used in the event of the former failing, so as to maintain the working of the engine. The turbo blowers are generally driven by the electric motors which are supplied with current from the auxiliary machinery installation. As a rule there are three Diesel driven dynamos, two of which are working and the third one constitutes a "stand by".

The old arrangement of two turbo blowers has a number of drawbacks. In the first place owing to the size of the turbo blowers, it is heavy and costly. Furthermore at low speeds of the propelling engine, when its requirements as regards scavenging air are small, there is the danger of the blower pulsating when its delivery is adjusted to the scavenging air requirements of the engine. Moreover, it is possible to adjust the delivery of the large blower to the scavenging air requirements only within narrow limits in such a manner as to ensure economical working in the case of small deliveries.

As a rule, the auxiliary machinery installation is calculated in such a manner that two sets together, connected in parallel, supply the current for the driving of the blower as well as for the lighting, pumps and other auxiliary ship apparatus. The arrangement may also be such that one Diesel driven dynamo would work the blower only and the second dynamo would be used only for the other current requirements of the ship installation. The drawback of the first arrangement is that the failure of one Diesel driven dynamo results in the overloading of the second Diesel driven dynamo working in parallel with it, in which case there is the danger (and practical experience has proved it) that owing to the overload, this second dynamo will also fail, in which event the ship will be unable to move. The second arrangement has the drawback that one Diesel driven dynamo has to be made at least large enough to be able to supply the whole of the current required for the blower. For the sake of "uniformity" the second (and generally also the third) auxiliary machine is made of the same size. The position will therefore be as follows:—One Diesel driven dynamo is working with full load and the second with a very small load as the current requirements for the ship at sea are very small. This results in an uneconomical working of these dynamos. In the event of the blower dynamo failing, either the third Diesel driven dynamo has to be started in order to enable the propelling engine to work again, or current must be taken from the second Diesel driven dynamo, which again means risk of an overload.

The above-mentioned drawbacks are eliminated according to the present invention by the use of three turbo blowers, each of which can handle a quantity of scavenging air equal to half that required by the propelling engine. Two turbo blowers are used for the normal working, while one is held in reserve. Owing to the smaller delivery of each blower the size becomes smaller and the total price and the total weight are also smaller than when two large blowers are installed. Moreover, this arrangement has a great range of adjustment in accordance with the scavenging air reqirements of the propelling engine. In the case of a reduced requirement in scavenging air, one blower for instance can be completely disconnected. The other blower can also be adjusted to at least half the delivery and to a correspondingly lower scavenging pressure. It is therefore possible to go down in an economical and reliable manner at least to one quarter of the normal scavenging air requirements, whilst in the old arrangement with a large blower this could be done only to about half the normal scavenging air requirements. Each of the turbo blowers is driven by an electric motor which is supplied with current by a separate Diesel driven dynamo. If the connection is effected in such a manner that one blower fails simultaneously with the Diesel driven dynamo, no overloading of the second Diesel driven dynamo which is working can take place when the first one fails. It is therefore possible to continue the journey at once with the second blower, with a correspondingly reduced speed of the propelling engine, without any disturbance and loss of time. There is the further advantage that the power of each Diesel driven dynamo need be made only sufficiently large as to ensure the supply of current for a blower of half the output, as well as for half the current requirements of the auxiliary machines working when at sea.

In the accompanying drawing, Figure 1 shows diagrammatically the old arrangement, and Figures 2 and 3 show diagrammatically two constructions according to the invention.

In Figure 1, the cylinders of a Diesel propelling engine are marked 1–6. $a$ is the corresponding scavenging air pipe to which the required scavenging air is delivered by a blower $b$ which is driven by an electric motor $c$. The latter receives its current from two switch boards $d$ and $e$ which are supplied by Diesel driven dynamos $f$ or $g$. $h$ is a reserve blower which is driven by the electric motor $i$ getting its current from the switch board $j$ which is supplied by a Diesel driven dynamo $k$. The reserve blower $h$, like the main blower $b$, delivers into the scavenging air pipe. Each of the blowers $b$ and $h$ has an output which is equal to the total scavenging air requirement of the propelling engine. The drawbacks of this arrangement hereinbefore referred to can be readily understood from this diagram.

In Figure 2, the six cylinders of a Diesel propelling engine are again marked 1–6, and $a$ is their scavenging air pipe. Unlike the old construction, however, there are three turbo blowers $l$, $m$ and $n$, each of which has an output equal to half the scavenging air requirement of the propelling engine. Two of these blowers, $l$ and $m$, deliver simultaneously to the scavenging air pipe; the third blower $n$ is kept in reserve and is connected to the scavenging air pipe by the pipes $o$ and $o^1$. By means of cocks $p$ and $p^1$, the pipes $o$ or $o^1$ can be shut off when required. The electric motors $q$, $r$ and $s$ of the blowers are again connected to switch boards $t$, $t^1$ and $t^2$ which are supplied with current by Diesel driven dynamos $u$, $v$ and $w$. The scavenging air pipe $a$ is subdivided by a transverse partition. The two scavenging air compartments thus provided communicate with each other by an opening in the transverse partition and the size of this opening can be adjusted by means of a slide valve $x$ or by some other regulating device which can be operated either by hand in accordance with the number of blowers which are working, or in accordance with their output, their numbers of revolutions or the current requirements of their electric motors. The opening could be adjusted so that the parallel working of the two turbo blowers $l$, $m$ normally delivering into the scavenging air pipe, is ensured, and so that it is further possible to cause sufficient scavenging air to pass from one compartment of the scavenging air pipe to the other in the event of its blower failing. Moreover, it is possible completely to separate the two compartments of the scavenging air pipe from each other, in the event of its becoming necessary to disconnect the other group of cylinders of the propelling engine on account of damage to one of its cylinders. The sub-division should be effected as far as possible so that the engine still remains fully capable of working.

If, owing for instance to the failure of the Diesel driven dynamo $u$, the blower $l$ fails, the speed of the propelling engine will be suitably lowered and the required scavenging air supplied by the blower $m$ alone, or at the same time the reserve blower can be brought in by starting the Diesel driven dynamo $v$, the blower $n$ in this case delivering either through the two pipes $o$, $o^1$, into the scavenging air pipe or, when the pipe $o^1$ is shut off by means of the valve $p^1$, only through the pipe $o$.

The construction shown in Figure 3 corresponds substantially to that of Figure 2. It differs from the latter only by the manner of sub-division of the scavenging air pipe which in this case is effected by means of an inserted longitudinal partition $y'$. The connection of the compartments thus produced can be regulated by means of an adjustable slide valve $x'$ in such a manner as to ensure parallel working of the two turbo blowers and the passage of the scavenging air from one compartment into the other. Similarly a complete separation or shutting off is also possible. $z'$, $z'$ are check or non-return valves mounted in the supply pipes to the scavenging air pipe for preventing a return of scavenging air from the scavenging air pipe to the blowers that have been disconnected.

Claims.

1. In apparatus of the character described, an arrangement of blowers acting as scavenging pumps for a two stroke internal combustion engine operating with scavenging air, comprising three blowers, each of which is capable of giving a normal delivery equal to half the scavenging air requirement of the said engine, two of said blowers being used for normal working of said engine and one being held in reserve.

2. In apparatus of the character described, an arrangement of blowers acting as scavenging pumps for a two stroke internal combustion engine operating with scavenging air, comprising three blowers, each of which is capable of giving a normal delivery equal to half the scavenging air requirement of the said engine, two of said blowers being used for normal working of said engine and one being held in reserve, and independent motors for driving each of said blowers.

3. In apparatus of the character described, a multi-cylinder internal combustion engine operating with scavenging air, a plurality of manifold chambers, each connected respectively with certain of said cylinders, independent means for supplying scavenging air to each of said manifold chambers, and means for effecting controlled intercommunication of the said manifold chambers.

4. In apparatus of the character described, a multi-cylinder internal combustion engine operating with scavenging air, a scavenging air manifold, a partition therein dividing said manifold into chambers, each chamber communicating with certain of the cylinders of said engine, means for supplying scavenging air to each of said manifold chambers, and means associated with said partition for effecting controlled intercommunication of the said manifold chambers.

5. In apparatus of the character described, a multi-cylinder internal combustion engine operating with scavenging air, a scavenging air manifold, a partition therein dividing said manifold into chambers, each chamber communicating with certain of the cylinders of said engine, separate blowers for supplying scavenging air to each of said manifold chambers, means associated with said partition for effecting controlled intercommunication of the said manifold chambers, and independent motors for driving each of said blowers.

6. In apparatus of the character described, a multi-cylinder internal combustion engine operating with scavenging air, a scavenging air manifold, a partition therein dividing said manifold into chambers, each chamber communicating with certain of the cylinders of said engine, blowers of smaller capacity than needed for the entire scavenging air requirement of said engine for supplying scavenging air to each of said chambers, means associated with said partition for effecting controlled intercommunication of the said manifold chambers, independent motors for driving each of said blowers, a reserve blower, an individual motor for said reserve blower, and means for effecting controlled connection of said reserve blower with each of said manifold chambers.

7. In apparatus of the character described, a multi-cylinder internal combustion engine operating with scavenging air, a scavenging air manifold, a partition therein dividing said manifold into chambers, each chamber communicating with certain of the cylinders of said engine, separate blowers for supplying scavenging air to each of said manifold chambers, means associated with said partition for effecting controlled intercommunication of the said manifold chambers, independent electric motors for driving each of said blowers, and independent Diesel driven dynamos for providing independent current supply for said electric motors.

8. In apparatus of the character described, a multi-cylinder internal combustion engine operating with scavenging air, a scavenging air manifold for said engine, a partition therein dividing said manifold into chambers, each chamber communicating with certain of the cylinders of said engine, separate blowers for normally supplying scavenging air to each of said manifold chambers, a reserve blower having connections with each of said manifold chambers, and means for controlling the delivery of scavenging air from said reserve blower to said several chambers.

9. In an apparatus of the character described, a two-stroke multi-cylinder engine operating with scavenging air and having a pair of manifold chambers each connected with a number of cylinders, an arrangement of blowers acting as scavenging pumps therefor comprising three blowers each of which is capable of giving a normal delivery equal to half the scavenging air requirement of the said engine, means connecting two of said blowers to said two manifold chambers, and means for connecting the third blower with either of said chambers so that any two of the blowers may be used for normal working of the engine while the third is held in reserve, and independent motors driving each of said blowers.

10. In apparatus of the character described, a multi-cylinder internal combustion engine operating with scavenging air and having a plurality of manifold chambers each connected with a number of engine cylinders, blowers each of smaller capacity than needed for the entire scavenging air requirement of the engine for supplying scavenging air to each of said chambers, a reserve blower, means for effecting controlled connection of said reserve blower with each of said chambers, and independent motors for driving each of said blowers, said blowers being all of substantially the same size.

In testimony whereof I have affixed my signature.

MAXIMILIAN PLOCHMANN.